UNITED STATES PATENT OFFICE.

WILLIAM A. FREEMAN, JR., OF NEWARK, NEW JERSEY.

IMPROVEMENT IN SAD-IRONS.

Specification forming part of Letters Patent No. 135,328, dated January 28, 1873.

*To all whom it may concern:*

Be it known that I, WILLIAM A. FREEMAN, Jr., of Newark, in the county of Essex and State of New Jersey, have invented a new and useful Improvement in Sad-Irons; and I do hereby declare that the following is a full, clear, and exact description of the same, reference being had to the accompanying drawing forming part of this specification, and in which—

Figure 1:
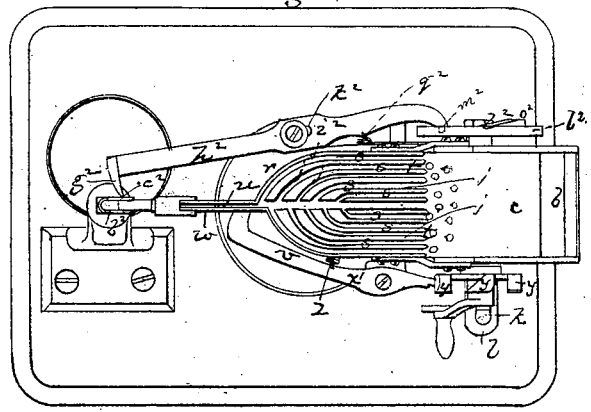
Figure 2:
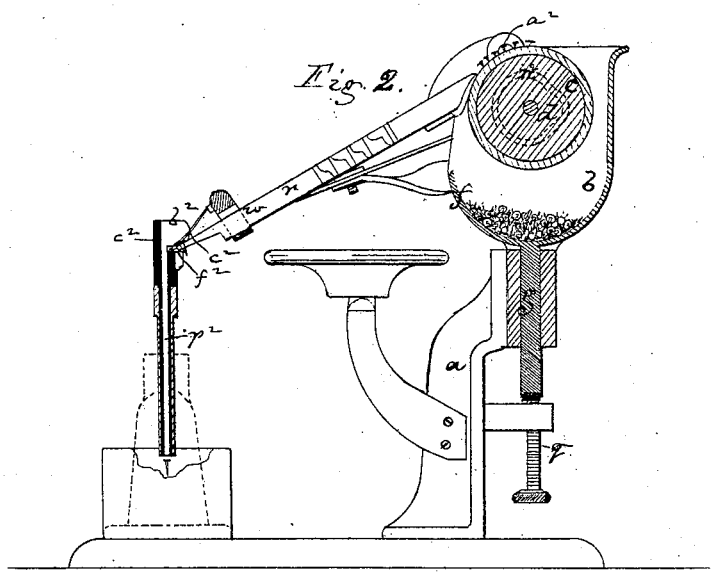

Figure 1 represents a side view of a sad-iron constructed in accordance with my improvement; Fig. 2, a vertical longitudinal section of the same; Fig. 3, a plan thereof; and Fig. 4, a side view, showing the handle as applied to removing the heater from the shoe, of which three parts the iron is composed.

Similar letters of reference indicate corresponding parts throughout the several figures.

My invention relates to a sad-iron made up of a detachable handle, a main body or heater, and a shoe or base shell in or on which the heater independently fits and to which it is secured, and the handle, heater, and shell firmly held in place by a fastening arranged to lock with a stud projecting upward from the shoe; and it consists in a tongue on the handle, in combination with a loop on the heater, to provide for handling the heater with facility and despatch. A sad-iron thus provided or constructed allows of the main body being separately heated and communicating its heat through a highly-polished shell or mere shoe; and the same detachable handle also answers both for handling the heater and for working the iron.

Referring to the accompanying drawing, A represents the main body or heater of the iron, which may be made of any desired size, weight, and pattern, and which is provided with a loop, $b$, on top at or near its back end. B is the base, shell, or ironing-shoe, that not being exposed to the action of the fire may be nickel-plated and kept highly polished, and which, in distinction to a regular box inclosing the heater, need only be a sole-piece, preferably with shallow sides corresponding to the shape of the heater at its bottom, thus constituting a shoe for the heater. Projecting upward from the interior of the sole or shoe is a tapering angular pillar, C, terminating in a stud, $c$, at top. The heater A has a hole through it corresponding in shape with the pillar or base of the stud to admit of the heater being slipped to its place over the latter and on or within the sole or shoe B. This pillar forms a steady hold for the heater, and also for the handle D, which is likewise perforated at its bottom to slip over and fit the pillar, leaving the stud proper, $c$, projecting above.

To secure the whole together, and allow of them being lifted in common by the handle, the latter is provided with a fastening, $g$, which locks with the stud $c$.

When it is desired to remove the heater A, the fastening $g$ is released from the stud $c$, as shown by dotted lines in Fig. 3, and the handle D taken off and a tongue, $h$, formed on the handle is fitted within the loop $b$ of the heater, whereby the latter may be lifted to and from the fire, as required.

What is here claimed, and desired to be secured by Letters Patent, is—

The tongue $h$ on the detachable handle D, in combination with the loop $b$ on the detachable heater A, substantially as shown and described.

W. A. FREEMAN, JR.

Witnesses:
    JAS. STANBROUGH,
    JOSEPH JONES.

2 Sheets--Sheet 1.

C. W. GLIDDEN.
Machines for Separating and Delivering Tacks.

No. 135,329. Patented Jan. 28, 1873.

Witnesses
M. W. Frothingham.
L. H. Latimer.

Inventor.
Charles W. Glidden,
By his Attys.
Crosby & Gould

AM. PHOTO-LITHOGRAPHIC CO. N.Y. (OSBORNE'S PROCESS)